(12) United States Patent
Bartley et al.

(10) Patent No.: US 7,873,773 B2
(45) Date of Patent: *Jan. 18, 2011

(54) MULTI-NODE ARCHITECTURE WITH DAISY CHAIN COMMUNICATION LINK CONFIGURABLE TO OPERATE IN UNIDIRECTIONAL AND BIDIRECTIONAL MODES

(75) Inventors: Gerald Keith Bartley, Rochester, MN (US); John Michael Borkenhagen, Rochester, MN (US); Robert Allen Drehmel, Goodhue, MN (US); James Anthony Marcella, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 566 days.

This patent is subject to a terminal disclaimer.

(21) Appl. No.: 11/740,640

(22) Filed: Apr. 26, 2007

(65) Prior Publication Data

US 2007/0189313 A1 Aug. 16, 2007

Related U.S. Application Data

(63) Continuation of application No. 10/897,341, filed on Jul. 22, 2004, now Pat. No. 7,254,663.

(51) Int. Cl.
*G06F 13/14* (2006.01)
*G06F 13/00* (2006.01)
*H04L 12/28* (2006.01)

(52) U.S. Cl. ............... 710/305; 370/405; 710/100; 710/110; 711/115

(58) Field of Classification Search ............... 711/115; 710/305, 100, 110; 370/406
See application file for complete search history.

(56) References Cited

U.S. PATENT DOCUMENTS

| 4,542,502 | A | 9/1985 | Levinson et al. | |
|---|---|---|---|---|
| 4,723,241 | A | 2/1988 | Grobel et al. | |
| 4,914,625 | A | 4/1990 | Billian | |
| 5,081,452 | A | 1/1992 | Cozic | |
| 5,136,589 | A | 8/1992 | Konishi | |
| 5,317,569 | A | 5/1994 | Ralph et al. | |
| 6,658,509 | B1 * | 12/2003 | Bonella et al. | 710/100 |
| 6,928,501 | B2 * | 8/2005 | Andreas et al. | 710/110 |
| 7,127,554 | B2 | 10/2006 | Buckingham | |
| 7,254,663 | B2 * | 8/2007 | Bartley et al. | 710/305 |
| 7,421,525 | B2 * | 9/2008 | Polzin et al. | 710/100 |
| 2002/0078280 | A1 * | 6/2002 | Arimilli et al. | 710/106 |
| 2004/0158675 | A1 * | 8/2004 | Hirose | 711/115 |

(Continued)

OTHER PUBLICATIONS

U.S. Patent and Trademark Office, Office Action issued in related U.S. Appl. No. 10/897,341, dated May 22, 2006.

(Continued)

*Primary Examiner*—Mark Rinehart
*Assistant Examiner*—Christopher A Daley
(74) *Attorney, Agent, or Firm*—Wood, Herron & Evans L.L.P

(57) ABSTRACT

A circuit arrangement, method and apparatus utilize communication links that are selectively configurable to operate in both unidirectional and bidirectional modes to communicate data between multiple nodes that are interconnected to one another in a daisy chain configuration. As a result, in many instances communications may be maintained with nodes located both before and after a discontinuity in a daisy chain configuration.

21 Claims, 5 Drawing Sheets

U.S. PATENT DOCUMENTS

| | | |
|---|---|---|
| 2004/0236877 A1 | 11/2004 | Burton |
| 2004/0252644 A1 | 12/2004 | Constantinescu |
| 2005/0044305 A1* | 2/2005 | Jakobs et al. ................ 711/105 |
| 2005/0060629 A1 | 3/2005 | Cochran et al. |
| 2005/0105350 A1 | 5/2005 | Zimmerman |
| 2005/0108469 A1 | 5/2005 | Freeman et al. |
| 2005/0138267 A1* | 6/2005 | Bains et al. ................. 711/100 |
| 2005/0146919 A1 | 7/2005 | Ellis et al. |
| 2006/0004968 A1 | 1/2006 | Vogt |

OTHER PUBLICATIONS

U.S. Patent and Trademark Office, Office Action issued in related U.S. Appl. 10/897,341, dated Oct. 6, 2006.

U.S. Patent and Trademark Final Office, Office Action issued in related U.S. Appl. No. 10/897,341, dated Mar. 19, 2007.

U.S. Patent and Trademark Office, Notice of Allowance issued in related U.S. Appl. No. 10/897,341, dated Apr. 5, 2007.

* cited by examiner

MULTI-NODE ARCHITECTURE WITH DAISY CHAIN COMMUNICATION LINK CONFIGURABLE TO OPERATE IN UNIDIRECTIONAL AND BIDIRECTIONAL MODES

CROSS-REFERENCE TO RELATED APPLICATIONS

This application is a Continuation of U.S. patent application Ser. No. 10/897,341, entitled "MULTI-NODE ARCHITECTURE WITH DAISY CHAIN COMMUNICATION LINK CONFIGURABLE TO OPERATE IN UNIDIRECTIONAL AND BIDIRECTIONAL MODES", filed on Jul. 22, 2004 by Gerald Keith Bartley et al. (now issued as U.S. Pat. No. 7,254,663), the disclosure of which is incorporated by reference herein.

FIELD OF THE INVENTION

The invention relates to computers and data processing systems, and in particular to communication links used to couple multiple nodes in a data processing system together in a daisy chain arrangement.

BACKGROUND OF THE INVENTION

Computer technology continues to advance at a remarkable pace, with numerous improvements being made to the performance of both processors—the "brains" of a computer—and the memory that stores the information processed by a computer.

One aspect of computer technology that can have a significant impact on system performance is the communication between various components in a computer or other data processing system. The communications between components such as processors, memory devices, processing complexes (sets of interconnected processors and memory devices), peripheral devices, and even separate computers, can have a significant effect on the overall performance of a computer system. Moreover, even from the perspective of individual components, and the various sub-components that may be disposed on the same or separate integrated circuit chips, the manner in which data is communicated within a computer system is often a significant contributor to the speed and computing power of the system.

For example, one prevalent architecture utilized to connect memory devices to a processor is a multidrop bus architecture, where a plurality of address and data lines are routed between a processor or intermediate memory controller to a plurality of memory devices. The various lines in the bus essentially couple the memory devices in parallel with one another, and each device receives the same signals. Typically, shared bus architectures of this type, despite improvements in terms of greater width (number of address and/or data lines) and data transmission rates, have been hampered by a number of drawbacks. First, the parallel nature of the architecture, and the resulting signal alignment issues that are raised by communicating data in a parallel fashion, have become limiting factors on the overall performance of the architecture. Moreover, the aforementioned issues also place limits on the lengths of the interconnects, and thus the types of connectors and form factors that are supported. Furthermore, these architectures are characterized by relatively high connector counts, thus requiring a high number of signal paths between devices.

One relatively recent memory architecture that has been utilized to address some of the shortcomings of a shared bus architecture involves the use of point-to-point interconnects between multiple nodes or components in a data processing system. Often, the point-to-point interconnects utilize serial transmission as opposed to parallel transmission, which can reduce the number of interconnects, while providing comparable or greater transmission speed due to the elimination of many of the signal alignment issues raised by parallel architectures. Some point-to-point architectures rely on complex switching to route data to desired components or nodes; however, other point-to-point architectures rely on individual nodes or components to forward data intended for other components coupled to the architecture.

In many applications, the use of point-to-point interconnects provides comparatively greater performance, as well as reduced connection counts and greater flexibility in terms of interconnecting components or nodes coupled to the architecture. Moreover, through the use of redundant connections, greater reliability may be provided, whereby the failure of a connection or a particular node may be overcome by routing data communications around a failed node.

As noted above, while some point-to-point architectures rely on complex switching or redundant connections, other point-to-point architectures desirably omit comparable data routing functionality to reduce complexity and cost, and to increase overall performance in some applications.

One such architecture is often referred to as a daisy chain architecture, where a sequence of nodes or components are interconnected by means of point-to-point interconnects coupled between adjacent nodes in the system. Often, the point-to-point interconnects comprise pairs of unidirectional interconnects, with one unidirectional interconnect used for communicating data in one direction between the adjacent nodes, and the other interconnect used to forward data in the opposite direction between the nodes. In such a configuration, the unidirectional interconnects form two unidirectional communication links, ensuring the data can be communicated between any two nodes in the architecture.

Incumbent in a daisy chain architecture is a capability within each node for forwarding data destined for a subsequent node in the architecture to the next adjacent node. In this regard, many daisy chain architectures provide driver circuits that essentially relay or repeat received signals and forward such signals as necessary to the next node in the architecture.

One specific example of a daisy chain architecture is implemented in the fully buffered dual inline memory module (FB-DIMM) memory architecture, for which a formal specification has been established by the Joint Electron Device Engineering Council, (JEDEC) of the Electronic Industry's Alliance (EIA). The FB-DIMM specification defines a high speed serial interface in which a memory controller is coupled to an FB-DIMM, upon which is disposed multiple memory devices and a controller device incorporating an interface between the memory devices and the high speed serial interface. The controller device also includes driver circuitry for repowering received signals and passing those signals along to the next FB-DIMM in the chain.

The high speed serial communication links between the components in an FB-DIMM architecture include separate unidirectional read and write channels made up of sets of differential signal pairs, and over which data and address information is passed. Separate clocking and control buses are also provided, but not implemented using point-to-point interconnects.

It has been found, however, that a conventional daisy chain architecture such as the FB-DIMM architecture is not readily suited for use in some high availability applications. In particular, one benefit of a conventional shared bus architecture is ability to provide "hot" replacement or swapping of individual devices in an architecture. For example, some conventional shared bus memory architectures support the ability to remove and replace individual memory devices while a system is running, and without requiring the system to be shut down. In such circumstances, power is typically removed from an individual device, the device is physically removed from its connector (e.g., a slot for a memory device disposed on a module or card), a new device is inserted into the connector, and power is applied to the new device. So long as the system logic avoids attempts to access the device being replaced during the replacement procedure, other devices may continue to be accessed during the procedure, thus ensuring continued system availability. Furthermore, since the devices are essentially coupled in parallel via a shared bus, and all signals are propagated to all devices, the unavailability of one particular device does not interrupt the communication of signals to other devices.

A daisy chain architecture such as FB-DIMM, on the other hand, relies on individual components (here each FB-DIMM) to forward signals received from previous components in the chain to subsequent components in the chain. As such, an individual FB-DIMM could not be powered off and removed from the system without causing a discontinuity in high speed serial interface that would prevent data from being communicated between the memory controller and any subsequent FB-DIMM's in the daisy chain.

As a result, conventional FB-DIMM and other daisy chain configurations may not be suitable for use in applications where high availability is desired.

SUMMARY OF THE INVENTION

The invention addresses these and other problems associated with the prior art by utilizing communication links that are selectively configurable to operate in both unidirectional and bidirectional modes to communicate data between multiple nodes that are interconnected to one another in a daisy chain configuration. In particular, embodiments consistent with the invention utilize at least one communication link that is capable of being switched from operating in a unidirectional mode to a bidirectional mode to permit communications to be maintained with nodes located both before and after a discontinuity in the daisy chain configuration.

Consistent with one aspect of the invention, for example, a circuit arrangement is provided that includes first and second data ports respectively configured to communicate over first and second communication links that couple together a plurality of nodes in a daisy chain configuration, coupled with a control circuit that is configured to selectively configure the first data port to selectively operate in unidirectional and bidirectional modes.

While the invention may be utilized in connection with other types of multi-node data processing systems, one specific application of the invention is in connection with a daisy chain configuration of memory modules coupled to a memory controller, where unidirectional read and write data channels are provided between the memory modules and the memory controller. In addition, in many embodiments it is desirable for the read data channel to be configured to couple the plurality of memory modules in a reverse daisy chain configuration relative to that for the write data channel.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed and illustrated hereinafter utilize selectively configurable communication links to interconnect multiple nodes in a multi-node data processing system in which at least a portion of the nodes are arranged in a daisy chain configuration. In the context of the invention, a daisy chain configuration is a point-to-point configuration whereby multiple nodes are chained together via point-to-point interconnects between adjacent nodes (i.e., nodes that are immediately next to one another in a defined sequence of nodes), which is in contrast to a multi-drop bus architecture whereby a shared bus is used to communicate information to all nodes. Individual nodes in a daisy chain configuration are typically able to receive data from a communication link and automatically forward such data along the communication link to subsequent nodes in the configuration if such data is not intended for local consumption.

Figure 1:
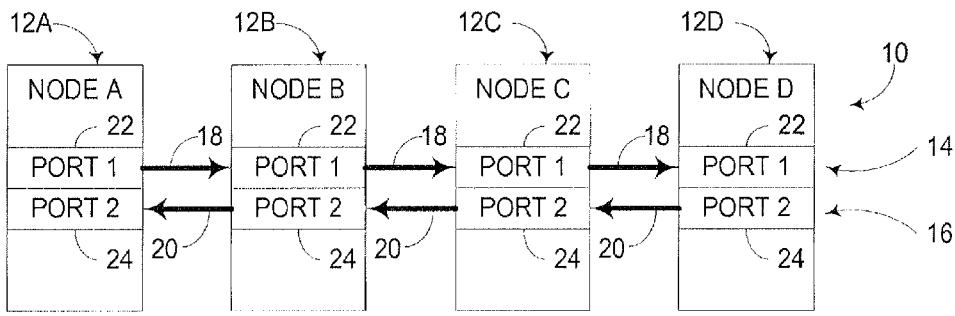
FIG. 1 is a block diagram of an exemplary multi-node data processing system incorporating a pair of communication links that interconnect a plurality of nodes in a daisy chain configuration.

For example, as shown in the Drawings, wherein like numbers denote like parts throughout the several views, and in particular in FIG. 1, a multi-node data processing system 10 may incorporate a plurality of nodes 12A-12D interconnected by first and second communication links 14, 16. Each communication link 14, 16 is a daisy chain communication link comprising a plurality of point-to-point interconnects 18, 20 that couple together adjacent nodes 12A-12D to one another such that the plurality of nodes are arranged together in a daisy chain configuration. Each node 12A-12D includes first and second data ports 22, 24, which respectively couple to the point-to-point interconnects 18, 20 defined in each communication link 14, 16. Each data port 22, 24 is configured to interface the node with the respective communication link (e.g., to pull data off, or put data on, the link), as well as to forward data received from an earlier node in the daisy chain arrangement to a subsequent node in the arrangement.

Of note, nodes 12A-12D define a sequence of nodes, with both starting (node 12A) and ending (node 12D) nodes defined for the sequence. In addition, each communication link 14, 16 shown in FIG. 1 is unidirectional in nature, such that data to be communicated from one node in the sequence to a later node in the sequence must be communicated over communication link 14, while data to be communicated from one node in the sequence to an earlier node in the sequence must be communicated over communication link 16.

As will be apparent to one of ordinary skill in the art, one characteristic of a daisy chain configuration of nodes is that a discontinuity in a communication link (e.g., due to failure or shutdown of a node, or a failure in an interconnect between two nodes) conventionally inhibits the ability to relay data across the discontinuity. As such, a discontinuity such as the unavailability of node 12B, for example, would inhibit data from being communicated over communication link 14 from node 12A to either of nodes 12C and 12D, as well as inhibit data from being communicated over communication link 16 from either of nodes 12C and 12D to node 12A.

It will be appreciated that in a multi-node system consistent with the invention, all of the nodes may be peers of one another (e.g., different processors or processing complexes), or in the alternative, one or more of the nodes may be utilizes as primary or master nodes, with the remaining nodes being secondary, backup or slave nodes. For example, in the embodiments discussed below, one node (e.g., node 12A) may be implemented as a memory controller, with the remaining nodes (e.g., nodes 12B, 12C, and 12D) implemented as memory modules.

In addition, it will be appreciated that each communication link 14, 16, as well as each interconnect paths 18, 20, may be implemented using any number of serial and/or parallel data signal paths. For example, in one serial communication link implementation, each interconnect 18, 20 may include a plurality of differential signal pairs for use in communicating serial data over the link. In other embodiments, each interconnect 18, 20 may include one or more single-ended signal paths in addition to or in lieu of differential signal pairs.

It will also be appreciated that additional interconnects, e.g., a shared or multi-drop bus, may also be provided between nodes 12A-12D in some applications, e.g., to provide power, clocking, or additional control signals.

As noted above, one limitation of a daisy chain configuration of nodes wherein unidirectional communication links are used to interconnect the nodes is that a discontinuity in a link may inhibit the communication of data across the discontinuity. Embodiments consistent with the invention address this difficulty in part by providing a selectively configurable communication link that may be switched from a unidirectional mode to a bidirectional mode. In addition, it may be desirable in some embodiments to additionally reverse the direction of one of the communication links such that, from the perspective of the communication link, the daisy chain arrangement of the nodes in the system is reversed with respect to the daisy chain arrangement established by the other communication link.

Figure 2:
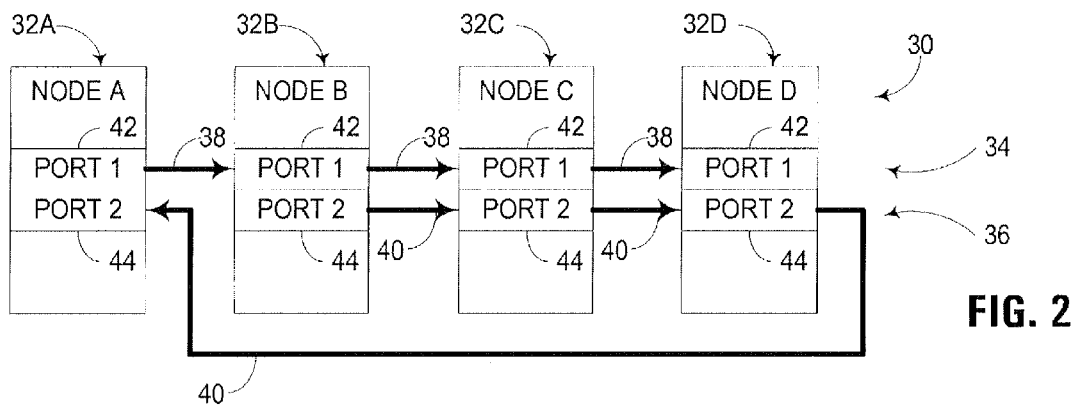
FIG. 2 is a block diagram of an exemplary multi-node data processing system consistent with the invention incorporating a pair of selectively configurable communication links that interconnect a plurality of nodes in a daisy chain configuration, shown operating in a unidirectional mode.

For example, FIG. 2 illustrates a multi-node data processing system 30 consistent with the invention, which may incorporate a plurality of nodes 32A-32D interconnected by first and second communication links 34, 36 (it will be appreciated that any number nodes may be interconnected in this manner). In this implementation, node 32A is a master node, and nodes 32B-32D are slave nodes. Each communication link 34, 36 is a daisy chain communication link comprising a plurality of point-to-point interconnects 38, 40 that couple together adjacent nodes 32A-32D to one another such that the plurality of nodes are arranged together in a daisy chain configuration. Each node 32A-32D includes first and second data ports 42, 44, which respectively couple to the point-to-point interconnects 38, 40 defined in each communication link 34, 36.

As with communication link 14 of system 10, communication link 34 interconnects nodes 32A-32D in a daisy chain configuration. However, in contrast to communication link 16 of system 10, communication link 36 interconnects nodes 32A-32D is a reverse daisy chain configuration with respect to communication link 34. In particular, rather than coupling node 32B directly to node 32A, with node 32D being the farthest from node 32A (as with communication link 34), communication link 36 couples node 32D directly to node 32A and leaves node 32B the farthest from node 32A. Put another way, nodes 32B-32D define a sequence of nodes that includes starting (node 32B) and ending (node 32D) nodes in the sequence. Communication link 34 couples node 32A directly to the starting node (node 32B), while communication link 36 couples node 32A directly to the ending node (node 32D). In this regard, it should be noted that the fact that communication link 36 defines a reverse daisy chain configuration relative to communication link 34 is based upon the arrangement of nodes, rather than the actual direction of information flow (since pairs of unidirectional communication links in a conventional daisy chain configuration typically transmit data in opposite directions).

Figure 3:
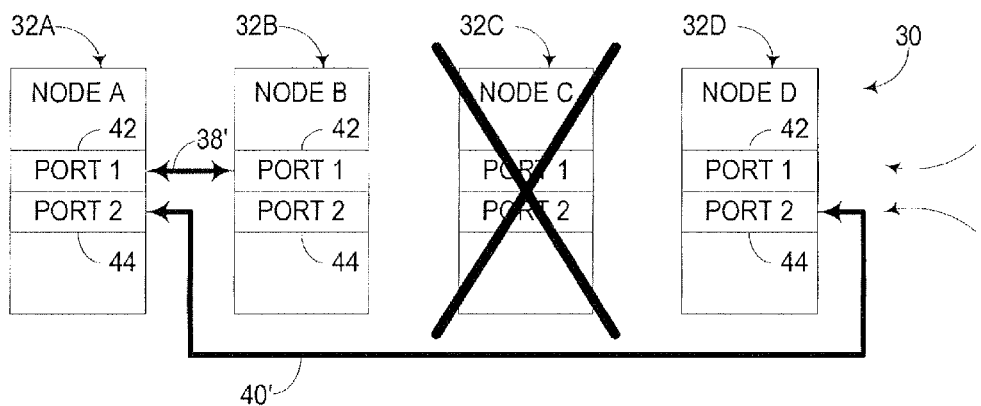
FIG. 3 is a block diagram of the multi-node data processing system of FIG. 2, shown operating in a bidirectional mode after a failure in one of the plurality of nodes.

The significance of such a configuration is best illustrated in FIG. 3, where a discontinuity in each communication link 34, 36 is represented by the unavailability of node 32C, which may be due to a failure in node 32C, a failure in an interconnect 38, 40 coupled to node 32C, or simply due to node 32C being taken off-line.

Consistent with the invention, each of communication links 34, 36 may be selectively configured to switch from a unidirectional mode (as illustrated in FIG. 2) to a bidirectional mode (represented by interconnects 38' and 40'), e.g., by reconfiguring ports 42, 44 on each node 32A-32D to operate in a bidirectional mode. By doing so, the unavailability of node 32C still enables node 32A to pass data to and receive data from node 32B via interconnect 38' of communication link 34, and to pass data to and receive data from node 32D via interconnect 40' of communication link 36. As such, the fact that a discontinuity is present in a daisy chain configuration does not isolate node 32D from the earlier nodes (nodes 32A and 32B) in the configuration.

As will become more apparent below, where system 30 is utilized in an application such as a memory application, where node 32A is a memory controller and nodes 32B-32D are memory modules, and where communication links 34, 36 are respectively configured to pass write data (and typically commands) from node 32A to nodes 32B-32D and to pass read data from nodes 32B-32D to node 32A, the switchover of links 34, 36 to bidirectional mode after the unavailability of node 32C permits both read and write data (as well as commands) to be communicated over each of links 34, 36 and thus maintain full connectivity between node 32A and each of nodes 32B and 32D (albeit with potentially reduced performance).

Figure 4:
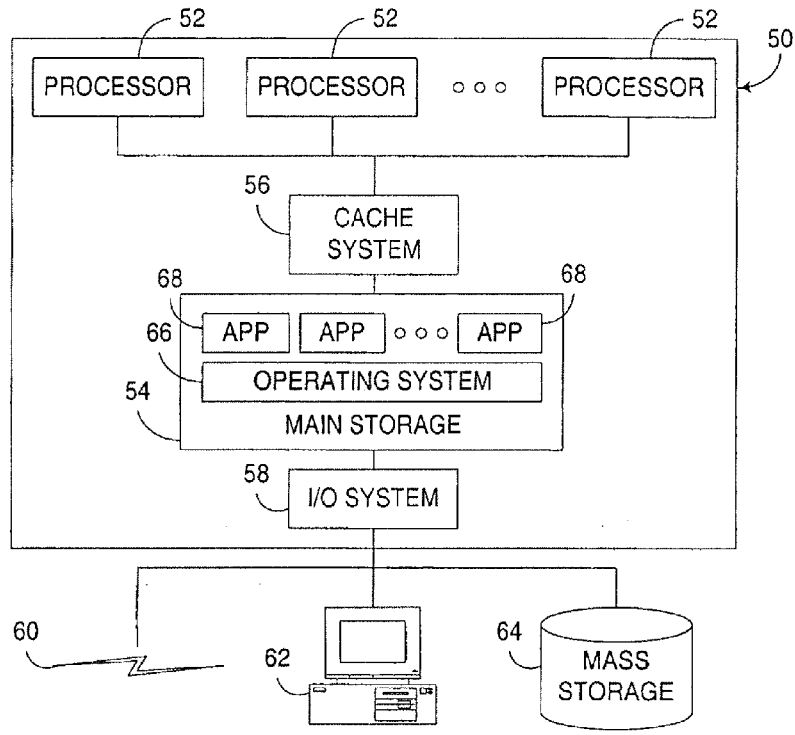
FIG. 4 is a block diagram of an exemplary apparatus incorporating an FB-DIMM memory architecture consistent with the invention.

As noted above, a multi-node data processing system may be used in a number of applications consistent with the invention. FIGS. 4-9, for example, illustrate one implementation of the invention within a memory architecture, and in particular an implementation that is compatible with the Fully Buffered Dual Inline Memory Module (FB-DIMM) standard. FIG. 4, in particular, illustrates a computer 50, which generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like), such as set top boxes, game machines, etc.

Computer 50 generally includes one or more processors 52 coupled to a main storage 54 through one or more levels of cache memory disposed within a cache system 56. In some embodiments each processor 52 may include multiple processing cores. Furthermore, main storage 54 is coupled to a number of types of external devices via a system input/output (I/O) system 58, e.g., one or more networks 60, one or more workstations 62 and one or more mass storage devices 64. Any number of alternate computer architectures may be used in the alternative.

Also shown resident in main storage 54 is a typical software configuration for computer 50, including an operating system 66 (which may include various components such as kernels, device drivers, runtime libraries, etc.) accessible by one or more applications 68.

Computer 50, or any subset of components therein, may also be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy disks, hard disk drives, CD-ROM's, and DVD's, among others, and transmission type media such as digital and analog communications links.

Figure 5:
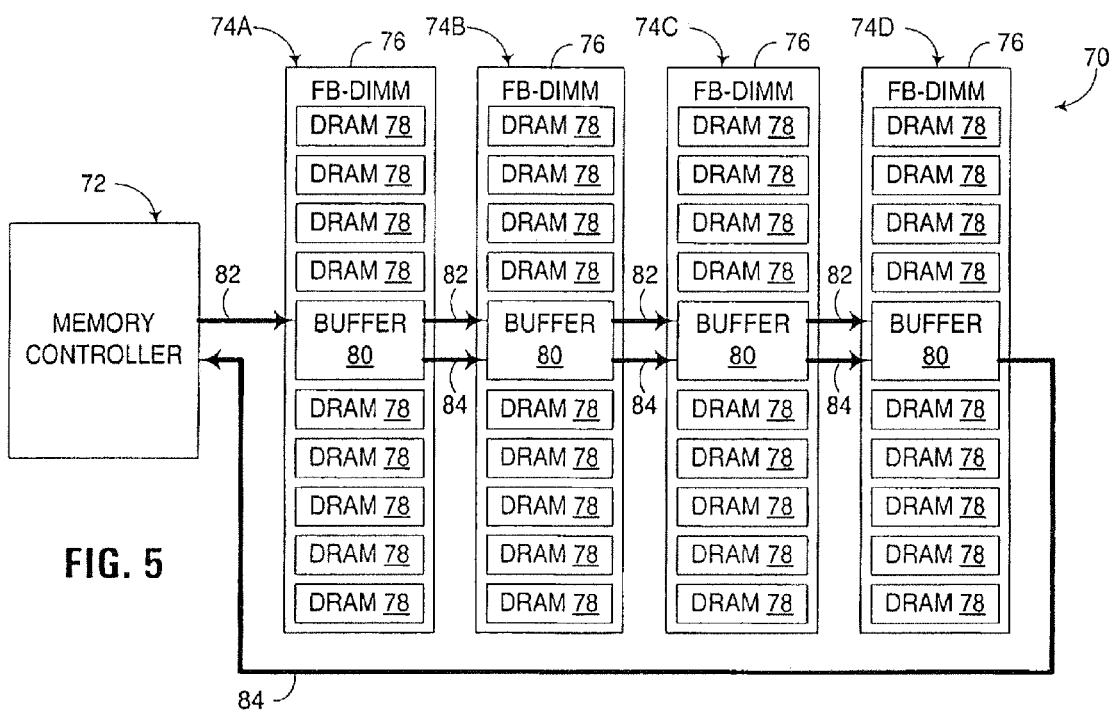
FIG. 5 is a block diagram of an exemplary FB-DIMM compatible implementation of the main storage in the apparatus of FIG. 5, shown operating in a unidirectional mode.

FIG. 5 next illustrates an exemplary memory architecture 70 consistent with the invention, and usable, for example, within main storage 54 of computer 50 (FIG. 4). Architecture 70 is illustrated including a memory controller 72 and a plurality of FB-DIMM memory modules 74A, 74B, 74C, and 74D, each representing a node in a daisy chain arrangement. While four memory modules 74A-74D are illustrated, it will be appreciated that any number of memory modules may be utilized consistent with the invention.

Each memory module 74A-74D is typically implemented using a printed circuit board or card 76 upon which is disposed a plurality of dynamic random access memory (DRAM) memory devices 78 and a buffer integrated circuit device or chip 80, the latter of which implementing an Advanced Memory Buffer (AMB) and controller consistent with the FB-DIMM specification. Each card 76 is typically received in a cooperative slot (not shown), which in the illustrated embodiment, is capable of being selectively powered on and off to permit removal and replacement of a memory module in the slot.

Memory modules 74A-74D are interconnected with one another and with memory controller 72 via a pair of high speed differential serial communication links defined by a plurality of point-to-point interconnects 82, 84. Interconnects 82, 84 respectively arrange memory modules 74A-74D in reverse daisy chain configurations relative to one another. In particular, the sequence of memory modules relative to memory controller 72 as created by interconnects 82 is from module 74A, to module 74B, to module 74C, and finally to module 74D. In contrast, with interconnects 84, the sequence of modules coupled to memory controller 72 are from module 74D, to module 74C, to module 74B, and finally to module 74A.

In this configuration, the communication link defined by interconnects 82 is used as a write data channel over which write data and commands are communicated from memory controller 72. Interconnects 84, on the other hand, define a read data channel over which data is provided to memory controller 72 by one or more of modules 74A-74D. It will be appreciated that additional interconnects, e.g., power, clocking and other control interconnects, are also provided by the FB-DIMM standard, but are not shown in FIG. 5.

Consistent with the invention, interconnects 82 and 84 are selectively configurable between unidirectional and bidirectional modes, which permits, among other benefits, the ability to provide continued availability to active memory modules 74A-74D even when a particular memory module is disabled or a discontinuity is otherwise present in either communication link.

Figure 6:
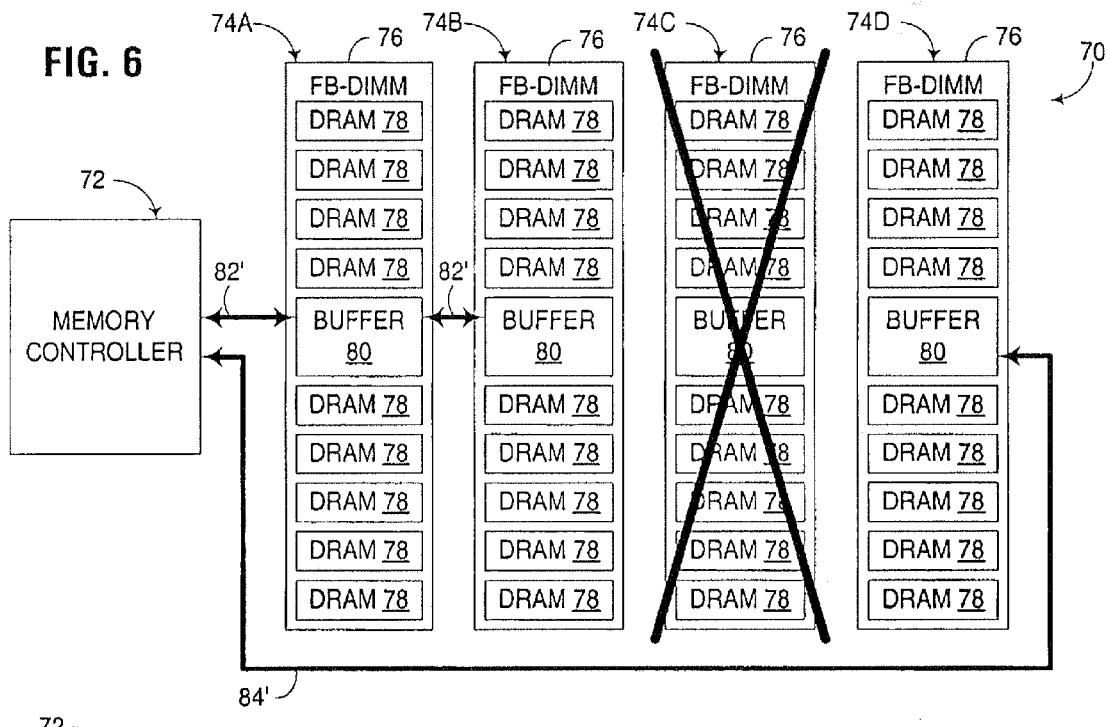
FIG. 6 is a block diagram of the FB-DIMM compatible implementation of the main storage of FIG. 5, operating in a bidirectional mode after unavailability of one of the FB-DIMM modules.

FIG. 6, for example, illustrates a discontinuity generated as a result of the unavailability of module 74C. For example, it may be desirable to hot replace memory module 74C due to a detected failure in the memory module. In this event, interconnects 82, 84 may be switched from a unidirectional mode to a bidirectional mode, as illustrated at 82', 84'. When in bidirectional mode, therefore, memory controller 72 is able to communicate both read and write data with modules 74A and 74B via interconnects 82', and to communicate both read and write data with module 74D via interconnect 84'.

Figure 7:
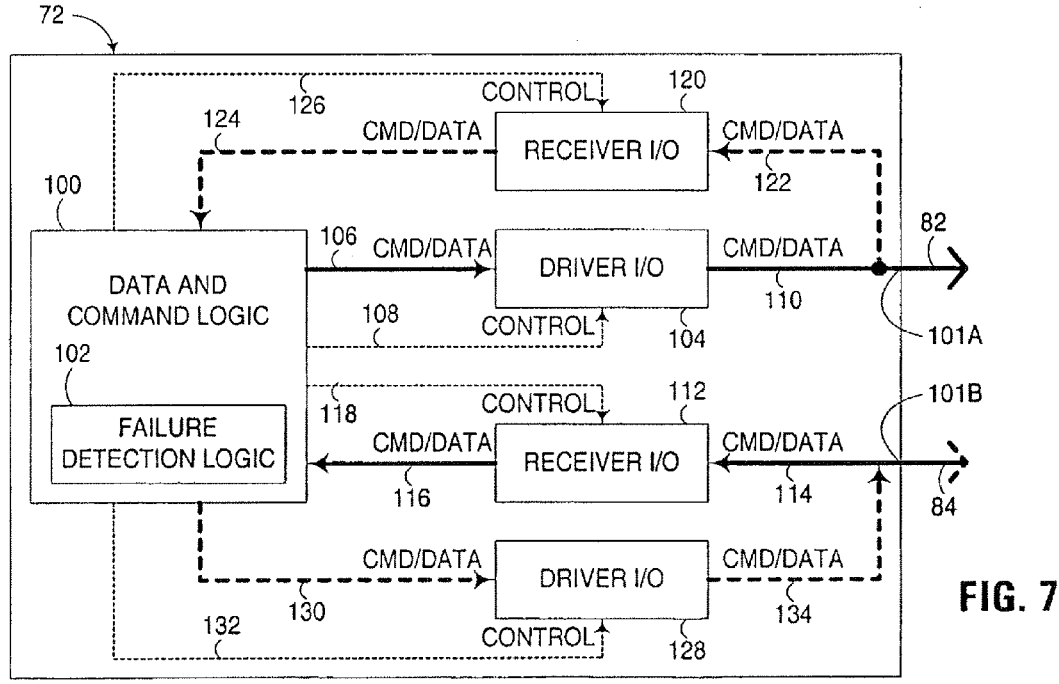
FIG. 7 is a block diagram of an exemplary implementation of the memory controller of FIG. 5.

FIG. 7 next illustrates an exemplary implementation of memory controller 72, specifically showing the Input/Output (I/O) circuitry utilized to drive a pair of read and write data channels. Additional circuitry in the controller, e.g., the interface to the processor or system bus, or integrated cache memories, have been omitted from FIG. 7. In this implementation, memory controller 72 is shown with a single pair of data ports 101A and 101B, for respectively coupling to write and read data channels via appropriate interconnects 82, 84. It will be appreciated that memory controller 72 may support multiple read/write channels, and thus may include multiple sets of data ports.

Memory controller 72 may include, for example, data and command logic block 100, which is utilized to initiate read and write operations in the memory storage and interface with a host processor. Incorporated into block 100 is failure detection logic 102, which is used to monitor the memory devices in the memory architecture, and may include, for example, Error Correcting Code (ECC) circuitry for correcting single or multi-bit failures, in a manner known in the art.

To drive the write data channel, memory controller 72 includes a driver I/O block 104, which receives command/data traffic over a data interconnect 106, with control over block 104 provided via control line 108 (which may encompass multiple signal paths). Block 104 drives interconnect 82 via control line 110.

Similarly, for the read data channel, a receiver I/O block 112 is coupled to interconnect 84 via a data interconnect 114, outputting command/data traffic to block 100 via data interconnect 116. Control over block 112 via block 100 is provided by control line 118.

Blocks 104 and 112 are respectively configured as driver and receiver circuits, suitable for powering and receiving signals consistent with the FB-DIMM specification.

When operational in a unidirectional mode, blocks 104 and 112 are activated by control lines 108, 118, thus enabling interconnects 82, 84 to operate in a unidirectional mode. To support bidirectional operation, additional circuitry, coupled to each of interconnects 82, 84, is additionally provided in memory controller 72. Specifically, to enable bidirectional operation of interconnect 82, a receiver I/O block 120 is coupled to interconnect 82 via data interconnect 122, outputting received command/data traffic to block 100 via data interconnect 124. A control line 126 is used to selectively activate block 120. Likewise, for interconnect 84, a driver I/O block 128 receives command/data traffic over data interconnect 130 and outputs such information over interconnect 84 via a data interconnect 134. A control line 132 is utilized by block 100 to selectively activate block 128.

Through the use of additional blocks 120, 128, block 100 is thus capable of selectively switching interconnects 82, 84 between unidirectional and bidirectional modes. It will be appreciated by the wide number of alternative circuit designs may be utilized to implement similar functionality. For example, bidirectional driver circuits may be utilized in lieu of separate driver and receiver blocks. It will also be appreciated that the implementation of memory controller 72 in an integrated circuit device would be well within the ability of one of ordinary skill in the art having the benefit of the instant disclosure.

Figure 8:
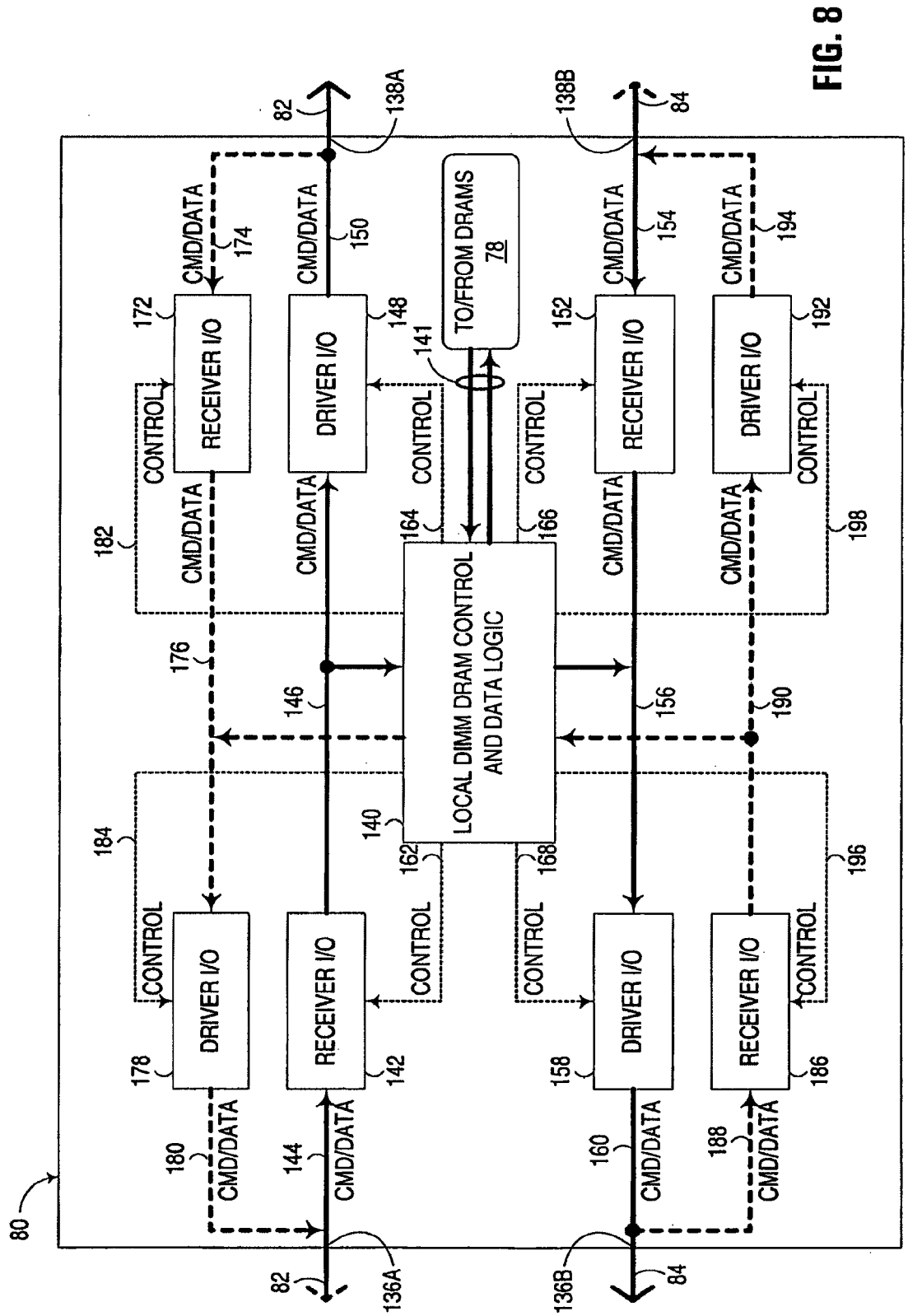
FIG. 8 is a block diagram of an exemplary implementation of the buffer of FIG. 5.

FIG. 8 next illustrates an exemplary implementation of buffer device 80 on each module 74A-74D. Buffer device 80 implements an FB-DIMM compatible Advanced Memory Buffer (AMB), and as a result, includes two pairs of data ports, with the first pair including data ports 136A, 136B, respectively configured for coupling to write and read data channels from adjacent nodes in the memory architecture, and with the second pair of data ports including data ports 138A, 138B, respectively configured for interconnection to different adjacent nodes in the memory architecture.

Buffer device 80 includes a local DIMM DRAM control and data logic block 140, which is utilized to provide an interface between the write and read data channels and the various memory devices 78 on the respective module (e.g., via an internal memory bus 141). For the write data channel, a receiver I/O block 142 is coupled to data port 136A via a data interconnect 144, and outputs over an interconnect 146 both to block 140 and to a driver I/O block 148. Block 148 is used to repower/repeat the command/data traffic received by block 142, for outputting to a subsequent node via data interconnect 150 coupled to data port 138A.

Likewise, for the read data channel, incoming command and data traffic from port 138B is received by a receiver I/O block 152 over a data interconnect 154. The output of block 152 is fed over a data interconnect 156 to a driver I/O block 158, which repowers/repeats the command and data traffic over port 136B via data interconnect 160. In addition, internal data from block 140 is also capable of being output to block 158 via data interconnect 156.

Control over blocks 142, 148, 152, and 158 is provided by a series of control lines 162, 164, 166, and 168. Moreover, blocks 142, 148, 152, and 158 in effect implement a unidirectional mode for the write and read data channels.

To implement a bidirectional mode of operation, a similar configuration to memory controller 72 is utilized. Specifically, for the write data channel, a receiver I/O block 172 is coupled to data port 138A via data interconnect 174, outputting over data interconnect 176 to a driver I/O block 178. Block 178 in turn outputs to data port 136A via a data interconnect 180. In addition, block 140 is coupled to data interconnect 176 to output local data over data port 136A. Control over blocks 172, 178, and thus enabling of a bidirectional mode is provided via control lines 182, 184.

Likewise for the read data channel, a receiver I/O block 186 is coupled to data port 136B via data interconnect 188, and outputs via a data interconnect 190 to a driver I/O block 192, and to block 140. Block 192 repowers and repeats such data over data port 138B via a data interconnect 194. Control lines 196, 198 are respectively used by block 140 to selectively enable blocks 186, 192, and thereby enable a bidirectional mode for the channel.

As with memory controller 72, buffer device 80 may be implemented in a number of alternate manners consistent with the invention. Moreover, the implementation of the functionality of device 80 in an integrated circuit device would be within the ability of one of ordinary skill in the art having the benefit of the instant disclosure.

From the standpoint of memory controller 72 and buffer devices 80, the outputting of commands, read data and write data proceeds in essentially the same manner as the conventional FB-DIMM protocol. The principal difference is that any locally-generated command/data traffic output by a component 72, 80 on one of its respective data ports in unidirectional mode (e.g., data port 101A for memory controller 72 and data port 138A for buffer device 80) also be output on the complementary data port when in bidirectional mode (e.g., data port 101B for memory controller 72 and data port 138B for buffer device 80). One manner of enabling such functionality is to simply output the same information to the appropriate driver blocks and selectively enable/disable the bidirectional driver blocks as necessary (e.g., blocks 104, 128 of memory controller 72 and blocks 148, 192 of buffer device 80).

It will therefore be appreciated that, through selective control of the driver/receiver blocks in device 80, the respective data ports 136A-B and 138A-B, and thus the data channels/communication links and interconnects therebetween, may be selectively operated in either unidirectional or bidirectional modes.

Figure 9:
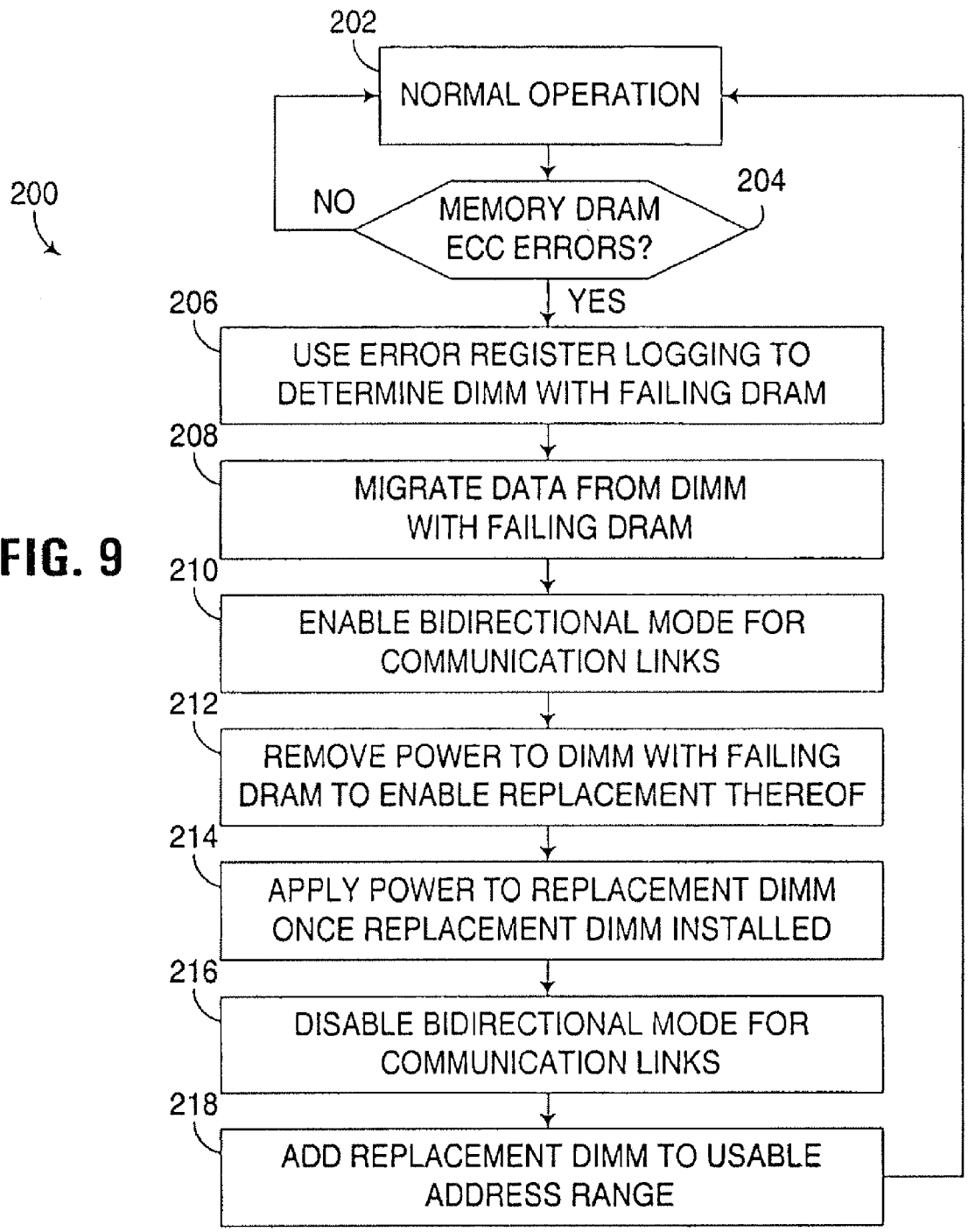
FIG. 9 is a flowchart illustrating the steps performed in connection with performing a hot replace of one of the FB-DIMM modules of FIG. 5.

Now turning to FIG. 9, an exemplary flowchart 200 illustrates the steps that may be performed in connection with performing a hot replace of one of the FB-DIMM modules of FIG. 5. In particular, block 202 represents the normal operation of the memory architecture, while block 204 represents the detection of memory ECC errors. For example, block 204 may determine whether more than a threshold amount of memory errors are being detected. If a sufficient threshold is met in block 204, control may pass to block 206 to use error register logging to determine which of the FB-DIMM modules is sourcing the errors. Next, block 208 migrates the data stored in the failing FB-DIMM to other, operational FB-DIMM's, and optionally paging memory out to non-volatile storage as necessary using conventional mechanisms.

Next, block 210 enables a bidirectional mode for the communication links. The enabling of a bidirectional mode may be implemented in a number of manners, e.g., by sending a dedicated command over one or both of the communication links. Alternatively, other mechanisms, such as the use of side band signals via the control circuitry for the FB-DIMM architecture, or the use of dedicated control lines, may be used to enable bidirectional mode.

Next, once bidirectional mode is enabled for the communication links, block 212 removes power from the slot for the failing FB-DIMM to enable a user to replace that failing FB-DIMM. Thereafter, once the failing FB-DIMM has been physically replaced with a replacement FB-DIMM, block 214 applies power to the replacement FB-DIMM, which typically initiates an initialization process for the replacement FB-DIMM.

Thereafter, block 216 disables bidirectional mode for the communication links, thus restoring normal operation. Block 218 then adds the replacement FB-DIMM to the usable address range for the main storage, whereby the replacement FB-DIMM may then be utilized for the storage of working data in a manner known in the art.

It will be appreciated that any of blocks 206-218 may be initiated automatically, or alternatively, may be initiated in response to user control, e.g., after a notification to a user of a potential failure condition. It will also be appreciated that, in addition to enabling hot replacement of failing FB-DIMM's, the herein-described configuration may be utilized to address other situations in which a discontinuity exists in a daisy chain architecture, e.g., in the event of a failed interconnect or a total failure of an FB-DIMM.

Additional modifications may be made consistent with the invention. Therefore the invention lies in the claims hereinafter appended.

What is claimed is:

1. A circuit arrangement, comprising:
   first and second data ports respectively configured to communicate over first and second communication links that couple together a plurality of nodes in a daisy chain configuration; and
   a control circuit configured to selectively configure the first data port and the second data port to selectively operate in unidirectional and bidirectional modes such that the first data port is configured to communicate the second type of data only when configured in the bidirectional mode and the second data port is configured to communicate the first type of data only when configured in the bidirectional mode;
   wherein the first data port is configured to exclusively communicate the first type of data when configured in the unidirectional mode, wherein the second data port is configured to exclusively communicate the second type of data when configured in the unidirectional mode, wherein the first and second data ports are each configured to communicate both the first and second types of data when in the bidirectional mode, wherein each of the first and second communication links is of the type including at least one interconnect between each pair of adjacent nodes in the daisy chain configuration, wherein each of the first and second data ports is disposed in a first node among the plurality of nodes and configured to couple to at least one interconnect between the first node and a second, adjacent node in the daisy chain configuration, and wherein the first and second nodes each comprise a memory module.

2. The circuit arrangement of claim 1, wherein each of the first and second data ports comprises a serial data port and wherein each of the communication links comprises a serial communication link.

3. The circuit arrangement of claim 1, wherein each of the first and second data ports is configured to respectively communicate over the first and second communication links using at least one differential signal pair.

4. The circuit arrangement of claim 1, wherein each of the first and second data ports is configured to respectively communicate over the first and second communication links using at least one single-ended signal path.

5. The circuit arrangement of claim 1, wherein each of the first and second data ports comprises at least one bidirectional driver.

6. The circuit arrangement of claim 1, wherein the first data port is configured to be coupled in a reverse daisy chain configuration relative to the second data port.

7. The circuit arrangement of claim 1, wherein the control circuit is configured to selectively configure the first data port to selectively operate in one of the unidirectional and bidirectional modes responsive to a command communicated over at least one of the first and second communication links.

8. The circuit arrangement of claim 1, wherein the first communication link comprises a read data channel, wherein the second communication link comprises a write data channel, and wherein the first data port is configured to communicate write data only when configured in the bidirectional mode.

9. An integrated circuit device comprising the circuit arrangement of claim 1.

10. A memory module, comprising:
    a plurality of memory storage devices; and
    an integrated circuit device including the circuit arrangement of claim 1.

11. The memory module of claim 10, wherein the integrated circuit device comprises a buffer.

12. The memory module of claim 10, wherein the memory module is an FB-DIMM module.

13. A program product, comprising a hardware definition program that defines the circuit arrangement of claim 1; and a computer readable signal bearing medium bearing the hardware definition program, wherein the signal bearing medium includes at least one of a transmission type media and a recordable media.

14. The circuit arrangement of claim 1, wherein the first communication link comprises a read data channel, wherein the second communication link comprises a write data channel, wherein the first type of data is read data, and wherein the second type of data is write data.

15. A method of communicating data between a plurality of nodes arranged in a daisy chain configuration and interconnected by first and second communication links that are respectively configured to communicate first and second types of data, the method comprising, in a first node among the plurality of nodes:

configuring each of first and second data ports in the first node that are respectively coupled to a second node by the first and second communication links to operate in a unidirectional mode such that each of the first and second data ports is configured to only communicate one type of data from among the first and second types of data;

communicating data through at least one of the first and second data ports while each of the first and second data ports is configured in the unidirectional mode;

reconfiguring each of the first and second data ports in the first node to operate in a bidirectional mode such that each of the first and second data ports is configured to communicate both types of data from among the first and second types of data; and communicating data through at least one of the first and second data ports while each of the first and second data ports is configured in the bidirectional mode;

wherein the first and second nodes each comprise a memory module.

16. The method of claim 15, wherein the second node comprises an FB-DIMM module.

17. The method of claim 15, wherein each of the first and second data ports comprises at least one bidirectional driver.

18. The method of claim 15, wherein the first data port is coupled in a reverse daisy chain configuration relative to the second data port.

19. The method of claim 15, wherein reconfiguring each of the first and second data ports in the first node to operate in the bidirectional mode is performed in response to a command communicated over at least one of the first and second communication links.

20. The method of claim 19, further comprising generating the command using the memory controller and communicating the command over the at least one of the first and second communication links.

21. An apparatus, comprising:

a plurality of memory modules, each memory module including at least one memory storage device;

a memory controller; and read and write data channels, each coupling the plurality of memory modules and the memory controller to one another in a daisy chain arrangement, wherein the read data channel is configured to communicate read data and the write data channel is configured to communicate write data, and wherein each of the read and write data channels is configurable to selectively operate in unidirectional and bidirectional modes such that when configured in the unidirectional mode read data is communicated only by the read data channel and write data is communicated only by the write data channel, and when configured in the bidirectional mode both read and write data are communicated by each of the read and write data channels.

* * * * *